United States Patent [19]

Tamura

[11] 4,346,403

[45] Aug. 24, 1982

[54] PROCESS AND DEVICE FOR PRODUCING ANIMATED CARTOONS

[75] Inventor: Shigeru Tamura, Tokyo, Japan

[73] Assignee: Kabushiki Kaisha n a c, Tokyo, Japan

[21] Appl. No.: 186,680

[22] Filed: Sep. 12, 1980

[30] Foreign Application Priority Data

Sep. 21, 1979 [JP] Japan ................................ 54-120708

[51] Int. Cl.³ .............................................. H04N 5/24
[52] U.S. Cl. ...................................... 358/93; 358/185; 352/87
[58] Field of Search .................. 358/93, 22, 127, 185, 358/102; 360/14; 35/26

[56] References Cited

U.S. PATENT DOCUMENTS

| | | | |
|---|---|---|---|
| 3,747,087 | 7/1973 | Harrison | 358/93 X |
| 3,800,441 | 4/1974 | Macpherson | 358/185 X |
| 4,005,261 | 1/1977 | Sato et al. | 358/93 X |

OTHER PUBLICATIONS

SMPTE Journal, vol. 85, No. 8, pp. 609-613, Aug. 1976.

Primary Examiner—Robert L. Richardson
Attorney, Agent, or Firm—James E. Nilles

[57] ABSTRACT

An animated cartoon production process is disclosed. The method comprises the steps of: photographing a plurality of drawings one by one using a TV camera; causing the photographed drawings to be stored one by one in an image storage device; and reproducing and displaying desired drawings for a certain time interval by an image display device to check the motion of the figures in the animation. The method further comprises the steps of producing in-between drawings between key shots, adjusting the key shots or removing any of them; and thereafter copying and painting the cells and filming the completed cells. An animated cartoon production device is disclosed. This device comprises a screen; a beam splitter disposed opposite to the screen; a TV camera that photographs the drawing on the screen through the beam splitter; an image storage device in which the images photographed by the TV camera are stored; and an image display device for reproducing the images stored in the image storage device and projecting them onto the screen through the beam splitter.

2 Claims, 3 Drawing Figures

PROCESS AND DEVICE FOR PRODUCING ANIMATED CARTOONS

BACKGROUND OF THE INVENTION

1. Field of the Invention

This invention relates to the process and device for producing animated cartoons which employ a screen and a projector type cathode ray tube that correspond to the light table in conventional devices so as to enable the reproduction of the live-action films and educational films and the tracing of the images on these films as well as the checking of the motion of the animated figures drawn by the animator.

2. Description of the Prior Art

An animated cartoon is made up of a series of slightly variant drawings. In checking the motion of the figures of the drawings before finally filming them, it has been a conventional practice to hand-feed or turn the series of successive drawings rapidly. This method largely depends on the technique of an animator who mastered it over long years of practice, and cannot be regarded as an accurate checking method. Thus, the accurate check on the motion of the figures can only be done by actually projecting the completed animated cartoon after the drawings have been painted and filmed. Assuming the number of drawings required to be projected for each second is twelve drawings, an animated cartoon of 30-minute duration requires a little more than 20,000 drawings. Thus, when unnatural motions of figures or some faults are detected only at the stage of projecting the film, it would require a great deal of work to correct them.

In the conventional devices, the tracing of the live-action film and animated cartoon film is done by means of film projection. In other tracing method monitored images are used. But because of the parallax caused by the thickness of glass in front of the monitor, a satisfactory tracing cannot be performed. To make up for this drawback, another method has been developed in which the monitored image is projected through a lens onto the screen. This method also has a problem that the projected image on the screen is dark making the tracing extremely difficult.

SUMMARY OF THE INVENTION

The object of this invention is to provide a process and device for producing an animated cartoon accurately and effectively.

This invention employs a TV camera to photograph the drawings one by one and record them on the video tape recorder so that desired drawings or frames recorded on the video tape can be reproduced and displayed on the monitor screen at desired speeds. This enables the animator to easily complete the in-between drawings and make adjustment easily. Because of the above features of this invention, the motion of the figures can be checked accurately before the entire drawings are filmed, obviating the conventional inaccurate checking method of rapidly hand-feeding the series of drawings.

The video processing unit of this invention has a random access frame memory that is not provided to the conventional video tape recorder. With this unit the following functions can be carried out.

(1) Desired frames can be repeatedly used in any way.

(2) In-between drawings can easily be completed and adjustment made.

(3) Drawings can be added or deleted freely.

(4) Necessary drawings can be retrieved from the storage device.

(5) Desired speed can be set at which the selected drawings or frames are reproduced.

(6) A certain movement of the figure can be reproduced repetitively.

(7) The drawings can be photographed or picked-up one by one and stored in the storage device.

Furthermore, this invention employs a projector type cathode ray tube to project a bright and clear image onto the blank sheet so that the image can be traced accurately without parallax. This enables the animator to easily draw a figure which is slightly varied from the preceding figure being projected. In this way, it is possible with this invention to trace easily and accurately various kinds of live-action films, animated cartoon films and graphic designs generated by computers.

DETAILED DESCRIPTION OF THE PREFERRED EMBODIMENT

Figure 1:
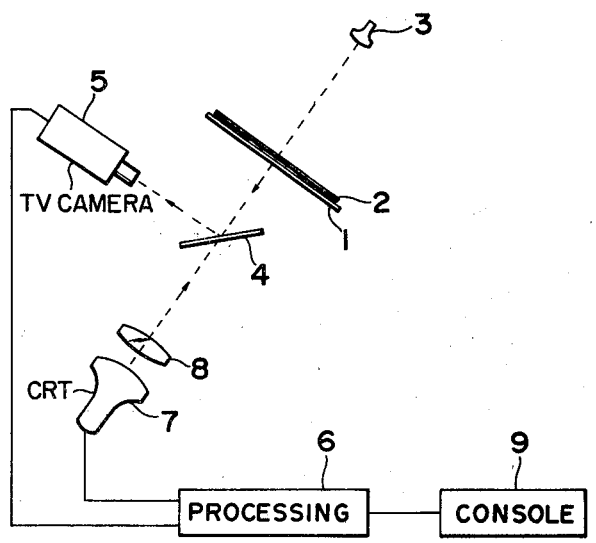
FIG. 1 is a schematic view of an animated cartoon producing device of this invention.

As shown in FIG. 1, an animated drawing paper 2 on which a drawing is made is placed on a screen glass 1 and is illuminated by a light 3 placed above the sheet. The illuminated image of the drawing is photographed by a TV camera 5 through a beam splitter 4 and is then stored in a video processing unit 6. After several images are stored in the video processing unit 6, they are projected from a CRT 7 through a projector lens 8 and the beam splitter 4 onto a blank sheet on the screen 1. The time division and the mode of reproducing selected frames is controlled by a console 9.

With the above device, it is easy to draw a sketch in which the positions or gestures of the figures are slightly varied from the preceding sketch if the prior sketch is projected onto the blank sheet on the screen 1 using the CRT 7 and the projector lens 8 and then a sketch is drawn referring to the preceding sketch being projected on the sheet. In this way, by projecting the drawings onto the screen 1, a series of slightly variant drawings can easily be made. This series of successive drawings are stored as an animated cartoon of a duration of a few seconds, which is further dubbed into the video tape recorder. Thus, an animated cartoon made up of line drawings can be produced without using the process of filming.

Several key drawings are placed on the screen 1 and photographed or picked-up by the TV camera 5 one by one in a predetermined order, and then stored in the video processing unit 6. To complete in-between drawings, the previously photographed key drawings are reproduced on the screen 1 allowing the animator to make a series of slightly variant drawings on the successive sheets on the screen. The series of in-between drawings are then processed by the video processing unit 6 as an action of figure of some duration.

The same drawing is reused when the same scene reappears in the animated cartoon. In the present device, the drawings stored in the video processing unit 6 are reviewed to pick-up and reproduce the desired drawings that are to be reused. Since in this device only the stored signals representing the drawings are processed, the retrieval of the drawings can be performed very easily as compared with the conventional device. This in turn keeps the original drawings intact which may otherwise be damaged or fouled as in the conventional device in which the original drawings are handled.

Figure 3:
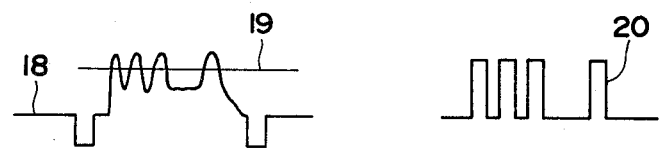
FIG. 3 illustrated waveforms of signals produced in the video processing unit.
Figure 2:
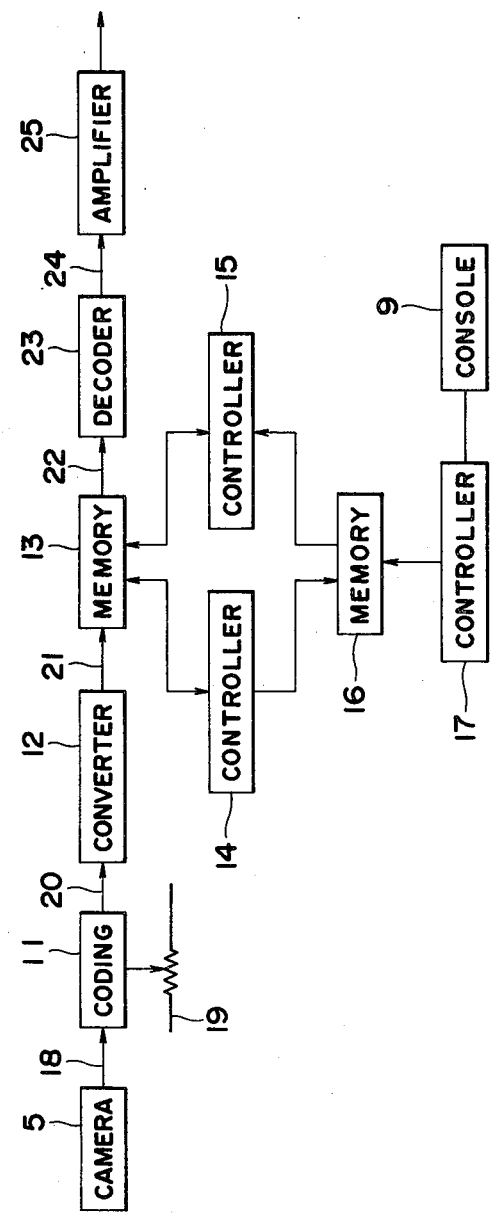
FIG. 2 is a block diagram showing the action of the video processing unit.

We will now explain the action of the video processing unit 6 with reference to FIGS. 2 and 3.

The TV camera 5 that photographs the drawing on the sheet 2 on the screen 1 of FIG. 1 sends signals 18 representing the drawing to a binary coding circuit 11 of the video processing unit 6 where they are converted into binary signals 20 according to a predetermined threshold voltage 19. The binary signals are inputted to a code converter 12 where they are converted into an 8-bit parallel format signal 21 which is written into the corresponding area of a memory 13 by a memory writing controller 14. In other words, the photograph signal 18 from the TV camera 5 is fed and stored in the memory 13 on a real time basis. At this time, the first address of the areas of the memory 13 in which the photographed drawing signals are stored is read into a frame start address memory 16. The frame start address memory 16 is connected to the console 9 through a frame controller 17. This console 9 directs the writing of the photographed drawing signal into the memory 13 as well as the retrieval of information stored in the memory 13. When the reproduction method to be described later is specified by the console 9, it is inputted to the frame controller 17 which outputs a reproduction indication frame (TV image of the drawing to be reproduced) to the start address memory 16 in accordance with the specified frame reproduction method to retrieve the start address of the reproduction indication frame. Given the reproduction indication start address, the reproduction controller 15 retrieves from the memory 13 corresponding reproduction indication data 22 (TV signal representing the drawing to be reproduced), which is converted by a decoder 23 connected to the memory 13 into a serial signal 24 in a manner similar to the input data 21 to the memory 13. The serial signal 24 is then amplified and outputted by an amplifier 25 as a synchronizing signal from the reproduction controller 15.

Some examples of checking the animated cartoon according to this invention will be shown in the following. Suppose a series of ten successive drawings 1', 2', . . ., 10' were photographed by the TV camera 5 and the photograph signals are stored in the memory 13 by the control from the console 9. When only the drawing 2' is to be used repeatedly, the frame controller 17 outputs a signal representing the frame 2' successively at the frame indication rate (1/30 second) of the television set. Next, if these shots 1', . . . , 10' are to be reproduced successively one after another, the frame controller 17 outputs these frames 1', . . . , 10' in that order at the TV frame indication rate. If it is desired that each frame be reproduced twice successively, the frame controller 17 outputs the frame signals 1', 1', 2', 2', 3', 3', . . . , 10', 10'. When only the key phases of movement are to be reproduced, the key frames are selected by the console 9. If, for example, the frames 1', 4', 7' are selected, the frame controller 17 outputs the frame signals repeatedly, i.e., 1', 4', 7', 1', 4', 7', . . . and so on. As can be seen in the foregoing examples, by giving various controls to the display of animation, it is possible to freely reproduce desired frames of animated cartoon.

What is claimed is:

1. An animated cartoon production process comprising the steps of: photographing a plurality of drawings one by one using a TV camera; causing the photographed drawings to be stored one by one in an image storage device; reproducing and displaying desired drawings successively by an image display device to check the motion of the figures in the animation; producing in-between drawings between key shots, adjusting the key shots or removing any of them; and thereafter copying and painting the cells and filming the completed cells.

2. An animated cartoon production device comprising: a screen; a beam splitter disposed opposite to the screen; a TV camera that photographs the image on the screen through the beam splitter; an image storage device in which the images photographed by the TV camera are stored; and an image display device for reproducing the images stored in the image storage device and projecting them onto the screen through the beam splitter.

* * * * *